United States Patent [19]

Nagashima

[11] Patent Number: 4,949,981
[45] Date of Patent: Aug. 21, 1990

[54] OIL SEAL

[75] Inventor: Akira Nagashima, Kawasaki, Japan

[73] Assignee: Kioritz Corporation, Tokyo, Japan

[21] Appl. No.: 333,361

[22] Filed: Apr. 5, 1989

Related U.S. Application Data

[63] Continuation of Ser. No. 77,210, Jul. 24, 1987, abandoned.

[30] Foreign Application Priority Data

Aug. 13, 1986 [JP] Japan .................. 61-124438[U]

[51] Int. Cl.⁵ .............................................. F16J 15/32
[52] U.S. Cl. .................................... 277/37; 277/153; 384/484
[58] Field of Search ............... 277/152, 153, 52, 35, 277/37; 384/484, 486

[56] References Cited

U.S. PATENT DOCUMENTS

| | | | |
|---|---|---|---|
| 2,434,686 | 1/1948 | Clayton-Wright | 277/153 |
| 2,697,623 | 12/1954 | Mosher . | |
| 2,808,277 | 10/1957 | Binder | 277/153 X |
| 2,873,153 | 2/1959 | Haynie | 384/484 |
| 2,915,345 | 12/1959 | Workman | 384/484 |
| 3,440,122 | 4/1969 | McCormick | 277/153 X |
| 3,813,102 | 5/1974 | Derman | 384/484 X |
| 4,304,414 | 12/1981 | Forch | 277/153 |
| 4,425,838 | 1/1984 | Pippert | 277/152 X |
| 4,531,747 | 7/1985 | Miura | 277/153 X |

FOREIGN PATENT DOCUMENTS

| | | | |
|---|---|---|---|
| 181763 | 4/1955 | Austria | 277/153 |
| 800550 | 10/1950 | Fed. Rep. of Germany | 384/484 |
| 944297 | 6/1956 | Fed. Rep. of Germany | 277/153 |
| 949916 | 9/1956 | Fed. Rep. of Germany | 277/153 |
| 2559471 | 6/1977 | Fed. Rep. of Germany . | |
| 3405513 | 4/1985 | Fed. Rep. of Germany | 277/153 |
| 78715 | 8/1955 | Netherlands | 277/153 |
| 94823 | 7/1960 | Netherlands | 277/153 |
| 391317 | 12/1973 | U.S.S.R. | 277/153 |
| 566435 | 12/1945 | United Kingdom | 277/153 |
| 1040930 | 9/1966 | United Kingdom | 277/152 |
| 1371341 | 10/1974 | United Kingdom | 277/153 |

Primary Examiner—Allan N. Shoap
Attorney, Agent, or Firm—Browdy and Neimark

[57] ABSTRACT

An oil seal is disclosed in which an axially extending annular portion is formed at a radially inward edge of either one of a support member and a sealing member. An annular elastic sealing member extends from a free end of the axially extending portion in a radially inward direction and in an axial direction opposite to the extending direction of the axially extending portion, thus forming a sealing portion for sealing an outer circumferential surface of the rotary shaft.

3 Claims, 3 Drawing Sheets

OIL SEAL

This is a continuation of application Ser. No. 077,210, filed July 24, 1987, now abandoned.

BACKGROUND OF THE INVENTION

1. Field of the Invention

The present invention relates to an oil seal and more particularly to an oil seal for sealing a clearance between a crankcase and a crankshaft of an internal combustion engine.

2. Description of the Prior Art

An oil seal of this type is known which is incorporated into a bearing for rotatably supporting a crankshaft relative to a crankcase. Since such an oil seal is produced in accordance with a particular specification, a great amount of work and a high cost are needed for the production. In addition, the sealing effect for outer and inner circumferential surfaces of the bearing would be incomplete or unsatisfactory, and the weight of the bearing including the oil seal weight would be unduly increased.

Also, there is provided another type oil seal in which an annular sealing member that is in sliding contact with an outer circumferential surface of the crankshaft is provided in the middle of an annular support member; an outer portion of the support member is made in the form of a sleeve; the sleeve portion is pressingly inserted into an opening of the crankcase that has been subjected to a finish machining work; and the support portion is mounted in place with the end of the sleeve portion being in contact with a thrust bearing plate. However, the oil seal of this type suffers from disadvantages such that it is time-consuming to mount the oil seal and a dead space within the crank chamber would be increased with a degradation in engine efficiency or an increase in a width of the engine.

SUMMARY OF THE INVENTION

Accordingly, an object of the invention is to provide a simple and convenient oil seal which may overcome the abovenoted disadvantages inherent in the conventional oil seals.

In order to attain this and other objects, according to the present invention, there is provided an oil seal comprising: an annular support member extending radially, the annular support member being mounted along its outer circumferential edge on a stationary structure; an annular sealing member fixed to a first surface of the support member, the annular sealing member being provided along its outer circumferential edge with a sealing portion in intimate contact with the stationary structure; an axially extending annular portion extending from a radially inwardly extending edge of one of the support member and the sealing member; and an annular elastic sealing member extending, in a radially inward direction and an axial direction opposite to the extending direction of the axially extending annular portion, from a free end of the axially extending annular portion to form a sealing portion to sealingly engage with an outer circumferential surface of a rotary shaft.

According to the present invention, since any structural component for the oil seal is not disposed on the opposite side of the first side surface of the annular support member, it is possible to bring the other side surface of the support member into direct contact with the bearing and to use it as a thrust bearing plate of the bearing. Also, since it is sufficient that a predetermined level of a width of the annular elastic sealing member which is sealingly engaged with the outer surface of the rotary shaft is ensured, it is possible to make small the axial dimension of the oil seal. Namely, according to the present invention, it is possible to shorten the axial dimension of the oil seal up to a minimum possible length and to reduce the thickness and the weight of the seal, and at the same time, the manufacturing process may be simplified with an advantage in assembling the oil seal into the engine. Also, it is possible to completely seal the pressure fluid, and the seal may be used as the thrust bearing plate to reduce the necessary number of the parts required, while enjoying the advantage of the compact oil seal. Also, in particular, when the oil seal of the invention is applied to the crankshaft sealing of a crank case precompression type two-cycle internal combustion engine, it is possible to reduce a dead space of the crankcase. For this reason, it is possible to increase a rate of the primary compression of the mixture within the crankcase to improve the engine efficiency. Also, it is possible to reduce a volume of crank webs corresponding to the reduction of the dead space. This leads to a reduction in weight of the engine.

DESCRIPTION OF THE PREFERRED EMBODIMENTS

The present invention will now be described by way of example with reference to the accompanying drawings.

Figure 1:
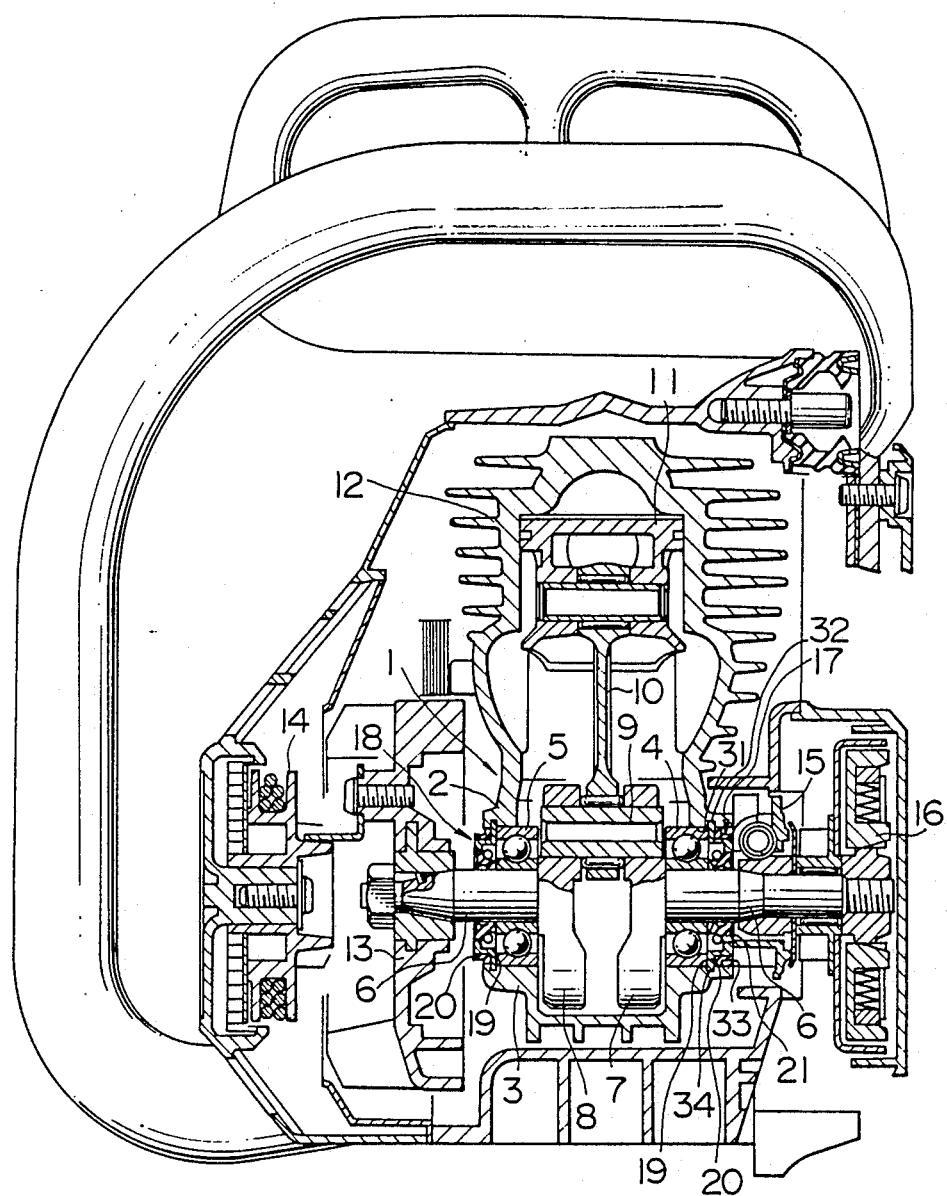
FIG. 1 is a longitudinal sectional view of an chain saw showing an oil seal in accordance with an embodiment of the invention.
Figure 2:
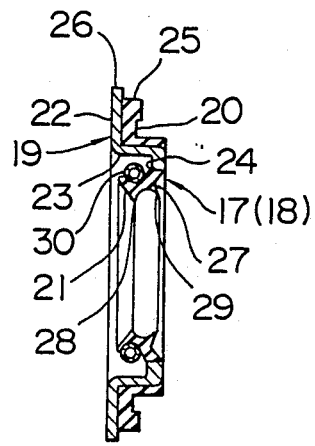
FIG. 2 is an enlarged cross-sectional view showing the oil seal shown in FIG. 1.

In the embodiment shown in FIG. 1, an oil seal in accordance with the present invention is applied to a crankcase precompression type two-cycle internal combustion engine. A crankcase 1 of the internal combustion engine includes an upper portion 2 and a lower portion 3 which are divided by a horizontal surface including a center axis of a crankshaft 6. The upper and lower portions are coupled to each other by means of bolts and the like (not shown) into a one-piece unit. Ball bearings 4 and 5 are arranged on opposite sides of the crankcase 1. The crankshaft 6 is rotatably supported through the ball bearings 4 and 5 by the crankcase 1. Crank webs 7 and 8 are fixed to the crankshaft 6 within the crankcase 1. The crank webs 7 and 8 are coupled to a piston 11 through a crank pin 9 and a connecting rod 10. The piston 11 is reciprocatingly disposed within a cylinder 12. The piston 11 is reciprocated by a combustion pressure of mixture introduced into the cylinder timely, thus rotating the crankshaft 6. A cooling fan 13 is mounted on one end portion of the crankshaft 6 to serve to apply cooling air to the internal combustion engine. At the same time, the internal combustion engine is coupled to a recoil starter 14 through the cooling fan 13 so that it may be manually started. On the other end of the crankshaft 6, there are provided an oil pump 15 and a clutch 16 so that the saw chain (not shown) may be drivingly rotated and the lubricant may be supplied to the saw chain.

The mixture to be introduced into the cylinder 12 is subjected to a primary compression within the crankcase 1. Therefore, the interior of the crankcase 1 is kept at a high pressure. In order to prevent the fluid kept at the high pressure from leaking from the opposite end portions of the crankcase 1, oil seals 17 and 18 in accordance with the present invention are arranged adjacent to the axially outward faces of the ball bearings 4 and 5, respectively. The arranging directions of the oil seals 17 and 18 are opposite to each other but the structures and the mounting methods of the oil seals are the same. Therefore, the right side oil seal 17 as viewed in FIG. 1 will now be explained.

As shown in FIG. 1 in more detail, the oil seal 17 includes an annular support member 19 made of rigid plate-like material such as metal, and an annular sealing member 20 made of suitable sealing material such as rubber and adhered to the support member 19 by, for example, baking.

The annular support member 19 is composed of a planar portion 22 extending radially outwardly, a sleeve portion 23 extending axially from the radially inward edge of the planar portion 22, and an inner edge portion 24 projecting radially inwardly from an end of the sleeve portion 23. The annular support member 19 is made into a one-piece having a cross-section of a generally L-shape.

The annular sealing member 20 is arranged on and along an outer surface of the planar portion 22 of the annular support member 19 on the sleeve portion 23 side and an outer circumferential surface of the sleeve portion 23. An outside diameter of the radially outward edge 25 of the sealing member 20 is slightly smaller than that of the radially outward edge 26 of the planar portion 22.

An annular elastic sealing member 21 made of elastic material such as rubber is disposed in a space defined by the sleeve portion 23 of the annular support member 19 and is fixed at one end 27 to the inwardly projecting end portion 24 of the support member 19. The sealing member 21 is provided on its inner circumferential surface integrally with an annular sealing edge 28 and an annular dust-proof lip portion 29 to be brought into sliding contact with the outer circumferential surface of the crankshaft 6. Also, a spring ring 30 is provided on the outer circumferential surface of the sealing member 21. The sealing edge 28 is brought into contact with the outer circumferential surface of the crankshaft 6 under a suitable pressure to mainly serve to prevent the pressure fluid (mixture) within the crankcase 1 from leaking through the ball bearing 4 to the outside. Also, the dust-proof lip portion 29 is brought into contact with the outer circumferential surface of the crankshaft 6 to mainly serve to prevent dust from entering from the outside into the crankcase 1.

Figure 4:
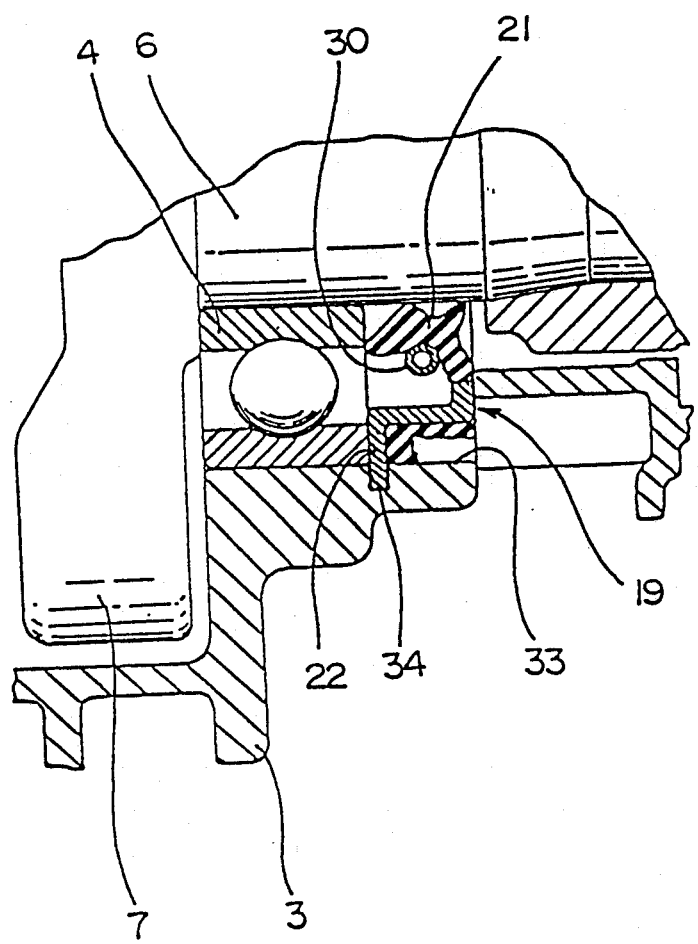
FIG. 4 is an exploded view of the oil seal according to the present invention.

FIG. 4 is an exploded view of the oil seal according to the present invention. The figure shows the planar portion 22 of the annular support member 19 engaged within the groove 34 in the circumferential surface 33 of the lower portion 3 of the crankcase 1.

In assembling, as shown in FIG. 1, the oil seal 17 is held without any displacement in the axial or radial direction, by the engagement of the radially outwardly extending edge 26 of the planar portion 22 of the annular support member 19 with a circumferential groove 32 formed in an end inner circumferential surface 31 of the upper portion 2 of the crankcase 1 and with a circumferential groove 34 formed in an end inner circumferential surface 33 of the lower portion 3 of the crankcase 1. The radially outermost edge 25 of the annular sealing member 20 is brought into intimate contact with the end inner circumferential surface 31 and 33 of the crankcase 1, thus interrupting the flow of fluid that would otherwise leak through the oil seal and the inner circumferential surfaces of the crankcase 1. The planar portion 22 of the support member 19 is brought into direct contact with an outer end face of the ball bearing 4 at the opposite surface to the sealing member 20, thus holding the ball bearing 4 without any axial displacement. Thus, the oil seal 17 also serves as a thrust bearing plate for the ball bearing 4. Also, it is apparent that instead of the ball bearings 4 and 5, any other type of bearings may be used.

Figure 3:
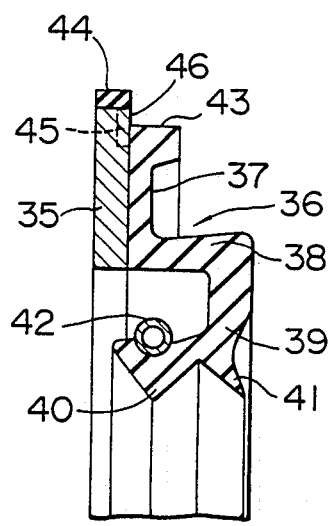
FIG. 3 is an upper half cross-sectional view showing an oil seal in accordance with another embodiment of the invention.

An oil seal in accordance with another embodiment of the invention will now be described with reference to FIG. 3. In this embodiment, the oil seal includes an annular rigid support member 35 made of an annular plate extending radially, and an annular elastic sealing member 36 made of elastic material such as rubber. The sealing member 36 is fixed, by baking, to one side surface of the support member 35 along an annular portion 37 extending radially. The sealing member 36 is provided integrally with a sleeve portion 38 extending axially from a radially inward end of the annular portion 37 and further with an inside portion 39 extending from one end of the sleeve portion 38 and bent in the axial direction inside the sleeve portion 38. The inside portion 39 is provided with a sealing edge 40 and a dust-proof lip portion 41 that are to be brought into contact with the outer circumferential surface of the crankshaft 6. The inside portion 30 is urged radially inwardly under pressure by a spring ring 42 mounted on an outer circumferential surface of the inside portion 39. The annular portion 37 of the sealing member 36 is to be brought into intimate contact with inner circumferential surfaces 31 and 33 of the end portion of the crankcase 1 along its outer circumferential edge 43, to seal the contact portion therebetween. An outer circumferential edge of the support member 35 which is to be engaged with the circumferential grooves 32 and 34 formed in the inner circumferential surfaces of the end portion of the crankcase 1 is provided with a ring 44 made of the same material as that of the sealing member 36. The ring 44 serves to damp the engagement shock with the circumferential grooves 32 and 34 and to further enhance the sealing effect between the grooves 32 and 34 and the support member 35. The annular portion 37 of the sealing member 36 and the ring 44 are connected to each other through a connecting portion 46 extending within a recess 45 formed in the support member 35. With such a structure, the sealing member 36 as well as the ring 44 may be formed by a single molding die as a whole.

I claim:

1. A composite oil seal for a bearing assembly to seal a clearance between two elements which rotate relative to one another, said seal comprising:

two substantially L-shaped annular members connected to one another to form a seal, each of said members comprising a radially extending portion having a first end forming a radially outward edge, and an axially extending portion extending from a second end of the radially extending portions of the respective members, a first of said members forming a support member and being disposed radially inwardly with respect to a second of said members, said second member being made of an elastic material, the radially outward edge of said second member having a circumference which is slightly smaller than a circumference of the radially outward edge of said first member, whereby when the radially outward edge of said first member is held without substantially any displacement in the axial or radial direction in a circumferential groove formed in an inner circumferential surface of a stationary structure, the radially outward edge of said second member is brought into intimate contact with the stationary structure so as to prevent flow of fluid through the oil seal;

an annular elastic sealing member extending, in a radially inward direction and in an axial direction opposite to the extending direction of said axially extending portion of said first member, from a free end of said axially extending portion of said first member to form a sealing portion to sealingly engage with an outer circumferential surface of a rotatable member.

2. The composite oil seal of claim 1, wherein said axially extending portions of said first and second members extend outwardly of the bearing assembly.

3. The composite oil seal of claim 1, wherein said radially outward edge of said second member has a thickness slightly greater than a thickness of said radially extending portion of said second member in the axial direction to form a seal with the stationary structure.

* * * * *